(12) United States Patent
Seehoffer et al.

(10) Patent No.: US 9,322,694 B2
(45) Date of Patent: Apr. 26, 2016

(54) APPARATUS TO CONFIRM CORRECT METER SIZING

(75) Inventors: Scott H. Seehoffer, Uniontown, PA (US); Jerry Potter, Mansfield, TX (US)

(73) Assignee: Master Meter, Inc., Mansfield, TX (US)

( * ) Notice: Subject to any disclaimer, the term of this patent is extended or adjusted under 35 U.S.C. 154(b) by 567 days.

(21) Appl. No.: 12/960,212

(22) Filed: Dec. 3, 2010

(65) Prior Publication Data

US 2011/0178733 A1    Jul. 21, 2011

Related U.S. Application Data

(60) Provisional application No. 61/267,994, filed on Dec. 9, 2009.

(51) Int. Cl.
| | |
|---|---|
| *G01F 1/00* | (2006.01) |
| *G01F 7/00* | (2006.01) |
| *G01F 15/06* | (2006.01) |
| *G01F 15/075* | (2006.01) |
| *G01F 15/14* | (2006.01) |

(52) U.S. Cl.
CPC ............ *G01F 15/063* (2013.01); *G01F 15/066* (2013.01); *G01F 15/0755* (2013.01); *G01F 15/14* (2013.01)

(58) Field of Classification Search
CPC ..... G01F 1/74; G01F 15/0755; G01F 1/8436; G01F 25/0007; G01F 15/024
USPC .......................................................... 702/45
See application file for complete search history.

(56) References Cited

U.S. PATENT DOCUMENTS

| | | | |
|---|---|---|---|
| 7,126,551 B2* | 10/2006 | Winter | 343/719 |
| 7,126,552 B2 | 10/2006 | Locatelli et al. | |
| 7,135,986 B2 | 11/2006 | Winter | |
| 7,343,795 B2* | 3/2008 | Winter | G01D 4/006 340/870.03 |
| 7,516,023 B2* | 4/2009 | Ferreira et al. | 702/45 |
| 7,942,068 B2* | 5/2011 | Ao et al. | 73/861.31 |
| 2002/0065614 A1* | 5/2002 | Bugarin et al. | 702/45 |
| 2002/0145568 A1* | 10/2002 | Winter | 343/701 |
| 2003/0028333 A1* | 2/2003 | Olson | 702/45 |
| 2003/0204335 A1* | 10/2003 | Bugarin et al. | 702/45 |
| 2005/0000302 A1* | 1/2005 | Winter | 73/861.77 |
| 2005/0007260 A1* | 1/2005 | Winter et al. | 340/870.01 |
| 2005/0171708 A1* | 8/2005 | Ferreira et al. | 702/45 |
| 2007/0112536 A1* | 5/2007 | Artiuch et al. | 702/100 |
| 2012/0059602 A1* | 3/2012 | Hobbs | 702/45 |

OTHER PUBLICATIONS

Johnson et al.; "Optimal Water Meter Sizing and Maintenance System (OSMS)"; presented at the Biennial Conference of the Water Institute of Southern Africa (WISA) held May 19-23, 2002, in Durban, South Africa.

* cited by examiner

*Primary Examiner* — Michael Nghiem
(74) *Attorney, Agent, or Firm* — The Webb Law Firm

(57) ABSTRACT

A meter register of the type having a sealed register body, and a member adapted to measure liquid flow through the meter and an antenna mounted within the register body is improved by providing a microprocessor adapted to have a calculated water meter maximum flow rate and a minimum flow rate defined as the meter flow rate range. The member co-acts with the microprocessor to determine flow rate, and the microprocessor is adapted to forward a signal to the antenna when the flow rate of the meter is outside, or within, the meter flow rate range, and the antenna transmits the signal to the water utility that the meter is not properly sized, or is properly sized, respectively.

20 Claims, 2 Drawing Sheets

APPARATUS TO CONFIRM CORRECT METER SIZING

CROSS REFERENCE TO RELATED APPLICATIONS

This application claims the benefit of U.S. Provisional Application No. 61/267,994, filed Dec. 9, 2009 and titled "Apparatus to Confirm Correct Meter Sizing" The disclosure and specification of U.S. Provisional Application No. 61/267,994 is hereby incorporated by reference.

BACKGROUND OF THE INVENTION

1. Field of the Invention

This invention relates to an apparatus to confirm correct meter sizing and, more particularly, to an apparatus to confirm that a water meter provided to a user by a utility is the proper size.

2. Discussion of Present Technology

The selection of water meter size for installations in buildings, e.g. commercial and residential buildings, can be made through a process that involves identification of the terminal water fittings and the expected water flow through the meter. In most instances, the process of determining meter size is usually only practiced when a meter is initially installed and when a replacement meter is installed. Seldom is the process to determine meter size practiced when changes occur that can effect water usage, e.g. but not limited to, the addition of a bathroom, the remolding of a bathroom and/or kitchen, the addition of outdoor water fittings to water the landscape, and/or an increase or decrease in the number of persons occupying the building.

As is appreciated by those skilled in the art, changes in the number of water fittings, changes in the number of persons occupying the building, and changes in water usage can result in the conversion of a properly sized installed water meter to an oversized, or an undersized water meter. The drawbacks with operating an oversized, or an undersized, water meter is a loss of revenue to the water utility, damage to the water meter, and varying water pressure in the pipes of the building. For a more detailed discussion on the subject matter of oversized and undersized water meters, reference can be made to the article titled "Optimal Water Meter Sizing and Maintenance System (OSMS)" authored by E. H. Johnson and B. E. Bold and presented at the Biennial Conference of the Water Institute of Southern Africa (WISA) held May 19-23, 2002, in Durba, South Africa.

In view of the need to monitor the flow through water meters to confirm correct meter sizing, it would be advantages to provide a water meter that has facilities to monitor water flow and to confirm that the water meter installed is correctly sized.

SUMMARY OF THE INVENTION

This invention relates to an improvement to a meter register of the type having a sealed register body having a face portion and a body defining an internal cavity, and a member mounted within the sealed registered body adapted to measure liquid flow through the meter. An antenna is provided in the internal cavity to transmit information regarding the liquid flow through the meter. The improvement of the invention includes, among other things, a microprocessor in the sealed register body adapted to have a calculated water meter maximum flow rate and a calculated minimum flow rate, defined as the meter flow rate range. The member, mounted in the sealed body, co-acts with the microprocessor to determine flow rate and the microprocessor is adapted to forward a signal to the antenna when the flow rate of the meter is outside, or within, the meter flow rate range. The antenna is adapted to transmit the signal.

DESCRIPTION OF THE PREFERRED EMBODIMENTS

Figure 1:
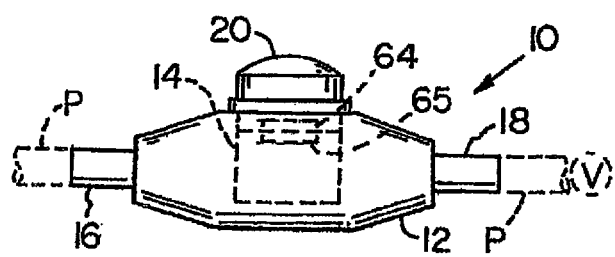
FIG. 1 is a side elevational view of a meter including a meter register that can be used in the practice of the invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

Non-limiting embodiments of the invention are directed to the practice of the invention on water meters; the invention, however, is not limited to water meters and any type of meter for measuring the flow of any type of a fluid can be used in the practice of the invention. Further, the invention will be directed to the type of water meter disclosed in U.S. Pat. No. 7,126,551 B2 (hereinafter also referred to as (U.S. Pat. No. '551); the invention, however, is not limited thereto and can be practiced on any type of water meter. U.S. Pat. No. 7,126, 551 B2 in its entirety is hereby incorporated by reference.

Figure 2:
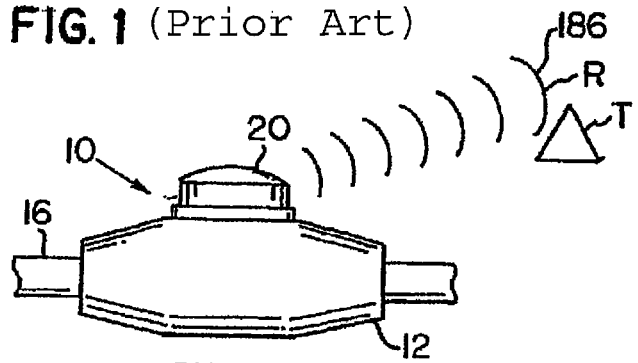
FIG. 2 is a side elevational view of the meter shown in FIG. 1 transmitting a signal to a receiver.

Shown in FIG. 1 is water meter 10 of the type disclosed in U.S. Pat. No. '551. The water meter 10 includes a body 12 having a measuring chamber 14, an inlet 16, an outlet 18, and a register 20. The measuring chamber 14 can include many different types of measuring-type chambers, such as positive displacement chambers and/or a vane or a multi jet type chamber. The inlet 16 and outlet 18 are adapted to be secured to piping P. The register 20 is a sealed register and in the non-limiting embodiment of the invention is magnetically coupled to the measuring chamber 14, which includes a magnetic drive arrangement that is well known in the art. The register 20 of the water meter 10 includes an arrangement to transmit and receive radio waves R as depicted in FIG. 2. The radio waves R are received by a transmission/receiving arrangement, such as a tower T.

Figure 3:
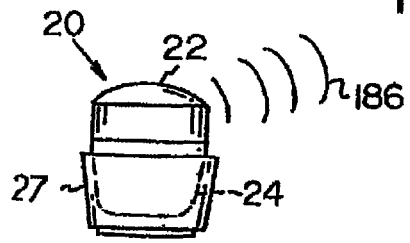
FIG. 3 is a side elevational view of a register that can be used in the practice of the invention.
Figure 4:
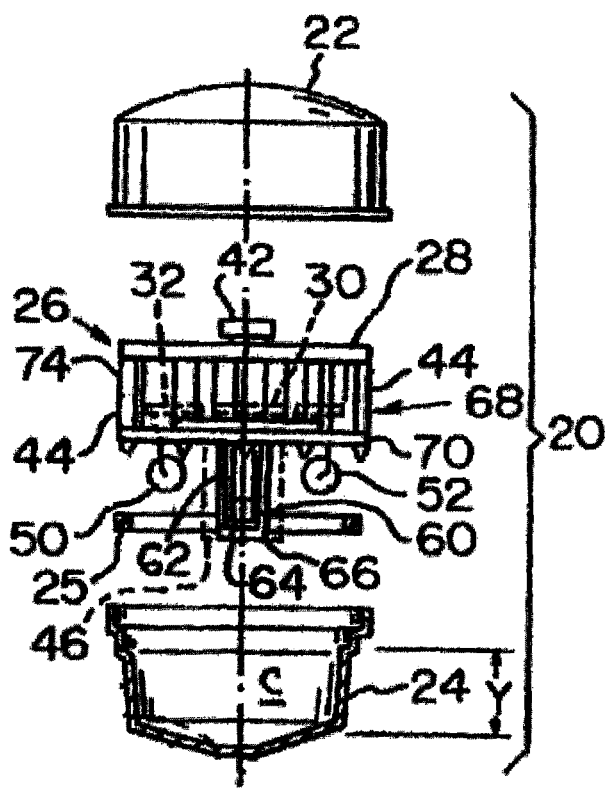
FIG. 4 is an exploded side elevational view, partially in section, of the register shown in FIG. 3.

With reference to FIGS. 3-6, as needed, the register 20 includes a face cap 22 attached to a metallic cup 24 (see FIGS. 3 and 4). Preferably, the face cap 22 is made of glass or a clear polymeric material and is fixably secured to the metallic cup 24, which can be made of copper or stainless steel. The metallic cup 24 can be received by a polymeric shroud 27 (see FIG. 3). The face cap 22 is mechanically sealed to the metallic cup 24 and includes a rubber gasket or seal 25 (see FIG. 14) to secure the face cap 22 and metallic cup 24 together and be held via a friction fit. An internal cavity C is defined by the face cap 22 and the metallic cup or bottom portion 24.

Figure 5:
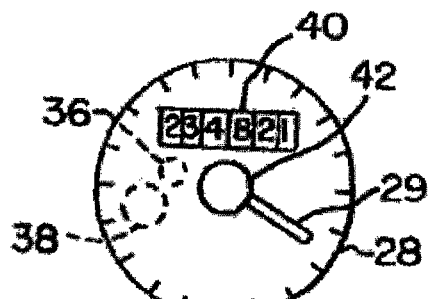
FIG. 5 is a top perspective view of a face plate and odometer of the register shown in FIGS. 3 and 4.

The register 20 includes a register subassembly 26. The register subassembly 26 includes a face plate 28, a dial 29 (clearly shown in FIG. 5), and a gear train drive 30. The gear train drive 30 includes a plurality of gears 32 co-acting with each other as shown in FIG. 4. Typically, the gears 32 are tooth gears that are meshed with one another. One of the gears 32S includes a magnet arrangement 34 that rotates about a sensing axis 140 (see FIG. 6). The magnet arrangement 34 takes the shape of a cruciform having four legs extending from a center, although any shape could be provided. The gear train drive 30 is coupled to a gear drive 36 positioned on the face plate 28 as shown in FIG. 5. The gear drive 36 includes meshed gears 38 which drive both an odometer 40 and a wheel dial 42, as well as a dial 29 (see FIG. 5). A plurality of spacer shafts 44 (see FIG. 4) is provided for spacing various boards of the register 20. A magnetic shield 46, shown in phantom in FIG. 4, is provided for anti-magnet protection. Clips are provided to connect meter components together, as is known in the art, including a circuit board 70. Batteries 50 and 52 are electrically coupled to the circuit board 70.

With particular reference to FIG. 4, a magnetic direction detection arrangement is provided on a lower portion of the subassembly 26 and includes magnetically activated reed switches. A magnetic drive arrangement 60 is provided and includes a shaft or extended shaft 62 and a magnetic coupling 64, which is adapted to co-act with a magnetic drive 65 (see FIG. 1) of the meter measuring chamber 14. A magnetic shield 66 or anti-magnetic housing is provided for protecting the electronics from magnetic fields. More specifically, the magnetic drive arrangement 60 includes the magnetic coupling 64 attached to and contained within the drive shaft 62. The drive shaft 62 is mechanically coupled to the gear drive train 30. With this arrangement, rotation of the drive shaft 62 provides the mechanical energy, i.e., force and torque, to drive the gear train drive 30.

Figure 7:
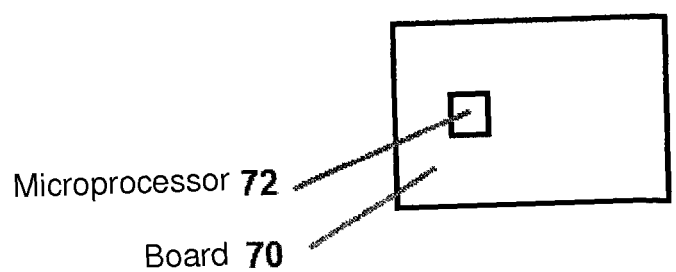
FIG. 7 is a view of a board that has a microprocessor.

As shown in FIG. 4, an electronics package 68 is provided within the register 20. The electronic package 68 includes the board 70 that has a microprocessor 72 shown in FIG. 7, which is electrically coupled to the batteries 50 and 52. The register 20 includes an antenna 74, e.g. a PIFA antenna, electronically coupled to the microprocessor 72. For a detailed discussion of the antenna, reference can be made to U.S. Pat. No. '551.

Figure 6:
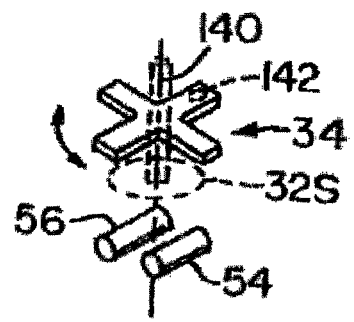
FIG. 6 is a top perspective view of the flow indicator of the meter register shown in FIG. 4.

The following discusses operation of the water meter 10. Initially, water passes through the inlet 16 causing the measuring chamber 14 to rotate. The water then flows through the outlet 18. The measuring chamber 14 causes the magnetic drive 65 attached to the measuring chamber 14 to rotate. The corresponding magnetic coupling 64 provided in the register 20 is likewise rotated, causing the drive shaft 62 to rotate. This in turn causes gears 32 of the gear train drive 30 to rotate, which in turn causes the odometer 40 to move indicating the quantity of liquid flowing through the meter. At the same time, the magnet arrangement 34 rotates causing the sensing magnet 142 to rotate about the reed switches 54 and 56 (see FIG. 6). Depending on the sequence of the state of the reed switches 54 and 56 as shown in FIG. 6, the microprocessor 72 can determine the number of rotations of the measuring chamber and the direction of rotation. In this manner, a signal can be provided to the antenna 74 indicating the number of rotations which, in turn, determines the volumetric amount of fluid passing through the meter. Also, in this manner, the position of the gear wheel 32S can be approximated by the state of the reed switches. Other types of position indicators can be used, such as that disclosed in U.S. Pat. No. 7,135,986, which is hereby incorporated by reference. The signal designated as 186 (see FIG. 2) is then transmitted through the antenna 74. The transmitted signal 186 is then picked up by a receiver as disclosed in U.S. Pat. No. '551.

In the practice of the invention, the microprocessor 72, in addition to providing a signal to the antenna 74 indicating the volumetric amount of fluid passing through the meter, the microprocessor 72 also determines if the water meter is correctly sized. In one non-limiting embodiment the invention, the expected water flow rate for the building, e.g. a residential home, is calculate in any usual manner, e.g. counting the number of terminal water fittings the building has and the expected flow rate through the meter. Based on the calculated flow rate, a properly sized water meter, to meet the calculated flow rate, is connected to the pipes P. The microprocessor 72 of the water meter is programmed with the maximum expected flow rate and the minimum expected flow rate, i.e., the meter flow rate range. In one non-limited embodiment of the invention, the water flow through the water meter is monitored, as described above and in U.S. Pat. No. '551. When the measured water flow rate is more than the maximum flow and certain other criteria programmed in the microprocessor 72, the microprocessor 72 sends a signal to the antenna 74 and the antenna 74 transmits a signal, e.g. an alarm signal to the utility that the installed meter is not the correct size. The other criteria could be the number of times that the flow rate exceeded the maximum flow rate. Also, other criteria could be the length of time that the flow rate exceeded the maximum flow rate. Other criteria could be the time intervals between when the flow rate exceeded the maximum flow rate. With this arrangement, no alarm signal transmitted from the water meter 10 is a confirmation that the installed meter is the correct meter size. As is appreciated, the microprocessor 72 can be programmed to send a continuous signal as long as the water flow rate through the meter 10 is within the flow rate range and discontinue the signal when the measured water flow rate is outside the flow rate range.

Some examples of undersized flow meters are as follows:
1. flow exceeding the maximum flow rate ten times; and/or
2. flow exceeding the maximum flow rate by a total amount of 1 hour; and/or 3. flow exceeding the maximum flow rate by ten times over the period of six months; and/or
4. flow through the meter exceeds recommended flow volume for a period of time, for example: 10,000 gallons over a three month period.

The microprocessor 72 can be programmed to monitor one or more of the above conditions and send an alarm to a utility if one or more of the conditions occur to indicate that the meter is undersized.

As can be appreciated, the invention is not limited to the program of the microprocessor 72 and any program indicating that the water meter is not properly sized, based on current water flow rate, can be used in the practice of the invention. Further, as can be appreciated, the invention is not limited to the embodiments of the invention discussed herein, and the scope of the invention is only limited by the scope of the following claims.

The invention claimed is:

1. A meter comprising a register and a meter body, wherein the register co-acts with the meter body to measure a volume of fluid passing through the meter body, the register comprising a register body and a microprocessor disposed within the register body, wherein an antenna is coupled to the microprocessor,
   the microprocessor having a programmed criteria defined to determine if an installed meter is a correctly sized meter by determining, using the microprocessor, whether a flow rate of fluid passed through the meter body satisfies the programmed criteria,
   wherein the microprocessor issues a first signal to indicate the measured volume of fluid passed through the meter body,
   wherein the microprocessor issues a second signal based on whether the programmed criteria is satisfied, and
   wherein the antenna transmits signals corresponding to the first and second signals issued by the microprocessor.

2. The meter as claimed in claim 1, wherein the meter is a utility meter.

3. The meter as claimed in claim 2, wherein the utility meter is a water meter.

4. The meter as claimed in claim 1, wherein the register body is a sealed register body.

5. The meter as claimed in claim 1, wherein the antenna is disposed within the register body.

6. The meter as claimed in claim 1, wherein the programmed criteria includes a predetermined volume value, wherein the microprocessor determines whether the volume of fluid passed through the meter body exceeds the predetermined volume value over a predetermined time interval, and wherein the microprocessor issues the second signal based on whether the volume of fluid passed through the meter body exceeded the predetermined volume value.

7. The meter as claimed in claim 1, wherein the programmed criteria includes a predetermined flow rate value, wherein the microprocessor determines whether a flow rate of fluid passed through the meter body is below the predetermined flow rate value, and wherein the microprocessor issues the second signal based on whether the flow rate of fluid passed through the meter body was below the predetermined flow rate value.

8. The meter as claimed in claim 1, wherein the programmed criteria includes a predetermined flow rate value, wherein the microprocessor determines whether a flow rate of fluid passed through the meter body exceeds the predetermined flow rate value, and wherein the microprocessor issues the second signal based on whether the flow rate of fluid passed through the meter body exceeded the predetermined flow rate value.

9. The meter as claimed in claim 8, wherein the microprocessor determines whether the flow rate of fluid passed through the meter body exceeded the predetermined flow rate value a predetermined number of times, and wherein the microprocessor issues the second signal based on whether the flow rate of fluid passed through the meter body exceeded the predetermined flow rate value the predetermined number of times.

10. The meter as claimed in claim 8, wherein the microprocessor determines whether the flow rate of fluid passed through the meter body exceeded the predetermined flow rate value over a predetermined time interval, and wherein the microprocessor issues the second signal based on whether the flow rate of fluid passed through the meter body exceeded the predetermined flow rate value over the predetermined time interval.

11. The meter as claimed in claim 8, wherein the microprocessor determines whether the flow rate of fluid passed through the meter body exceeded the predetermined flow rate value a predetermined number of times over a predetermined time interval, and wherein said microprocessor issues the second signal based on whether the flow rate of fluid passed through the meter body exceeded the predetermined flow rate value the predetermined number of times over the predetermined time interval.

12. A method of confirming whether an installed meter is a correctly sized meter, comprising the steps of;
   measuring a volume of fluid passing through a meter body of an installed meter, the meter comprising a register and a meter body, wherein the register co-acts with the meter body to measure the volume of fluid passing through the meter body;
   determining whether a flow rate of fluid passed through the meter body satisfies a programmed criteria defined in a microprocessor disposed within a body of the register to determine if an installed meter is a correctly sized meter;
   issuing a first signal from the microprocessor to indicate the measured volume of fluid passed through the meter body;
   issuing a second signal from the microprocessor based on whether the programmed criteria is satisfied; and
   transmitting signals from an antenna coupled to the microprocessor corresponding to the first and second signals issued by the microprocessor.

13. The method as claimed in claim 12, wherein the second signal is issued if the installed meter is a correctly sized meter.

14. The method as claimed in claim 12, wherein the second signal is issued if the installed meter is an incorrectly sized meter.

15. The method as claimed in claim 12, wherein the programmed criteria includes a predetermined volume value, wherein the microprocessor determines whether the volume of fluid passed through the meter body exceeds the predetermined volume value over a predetermined time interval, and wherein the microprocessor issues the second signal based on whether the volume of fluid passed through the meter body exceeded the predetermined volume value.

16. The method as claimed in claim 12, wherein the programmed criteria includes a predetermined flow rate value, wherein the microprocessor determines whether a flow rate of fluid passed through the meter body is below the predetermined flow rate value, and wherein the microprocessor issues the second signal based on whether the flow rate of fluid passed through the meter body was below the predetermined flow rate value.

17. The method as claimed in claim 12, wherein the programmed criteria includes a predetermined flow rate value, wherein the microprocessor determines whether a flow rate of fluid passed through the meter body exceeds the predetermined flow rate value, and wherein the microprocessor issues the second signal based on whether the flow rate of fluid passed through the meter body exceeded the predetermined flow rate value.

18. The method as claimed in claim 17, wherein the microprocessor determines whether the flow rate of fluid passed through the meter body exceeded the predetermined flow rate value a predetermined number of times, and wherein the microprocessor issues the second signal based on whether the flow rate of fluid passed through the meter body exceeded the predetermined flow rate value the predetermined number of times.

19. The method as claimed in claim 17, wherein the microprocessor determines whether the flow rate of fluid passed through the meter body exceeded the predetermined flow rate value over a predetermined time interval, and wherein the microprocessor issues the second signal based on whether the flow rate of fluid passed through the meter body exceeded the predetermined flow rate value over the predetermined time interval.

20. The method as claimed in claim 17, wherein the microprocessor determines whether the flow rate of fluid passed through the meter body exceeded the predetermined flow rate value a predetermined number of times over a predetermined time interval, and wherein the microprocessor issues the second signal based on whether the flow rate of fluid passed through the meter body exceeded the predetermined flow rate value the predetermined number of times over the predetermined time interval.

\* \* \* \* \*

UNITED STATES PATENT AND TRADEMARK OFFICE
CERTIFICATE OF CORRECTION

PATENT NO. : 9,322,694 B2
APPLICATION NO. : 12/960212
DATED : April 26, 2016
INVENTOR(S) : Scott H. Seehoffer et al.

It is certified that error appears in the above-identified patent and that said Letters Patent is hereby corrected as shown below:

In the claims,

Column 6, Line 31, Claim 12, delete "of;" and insert -- of: --

Signed and Sealed this
Nineteenth Day of July, 2016

Michelle K. Lee
*Director of the United States Patent and Trademark Office*